C. M. MANLY.
MOTOR CONTROLLING DEVICE.
APPLICATION FILED AUG. 8, 1906. RENEWED JAN. 31, 1919.

1,318,399.

Patented Oct. 14, 1919.
4 SHEETS—SHEET 1.

Witnesses
R. J. Frazier, Jr.
R. Bredekamp.

Inventor
Charles M. Manly
By Smith & Frazier
Attys.

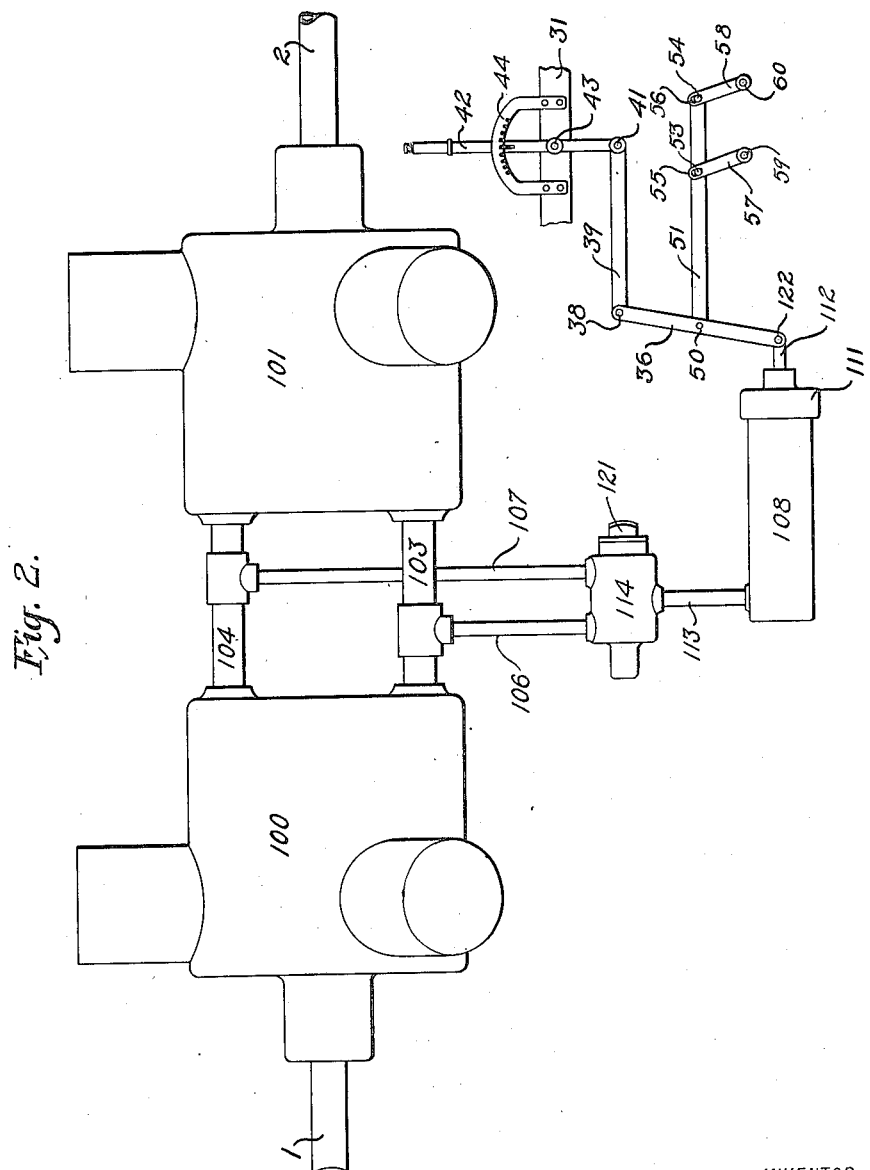

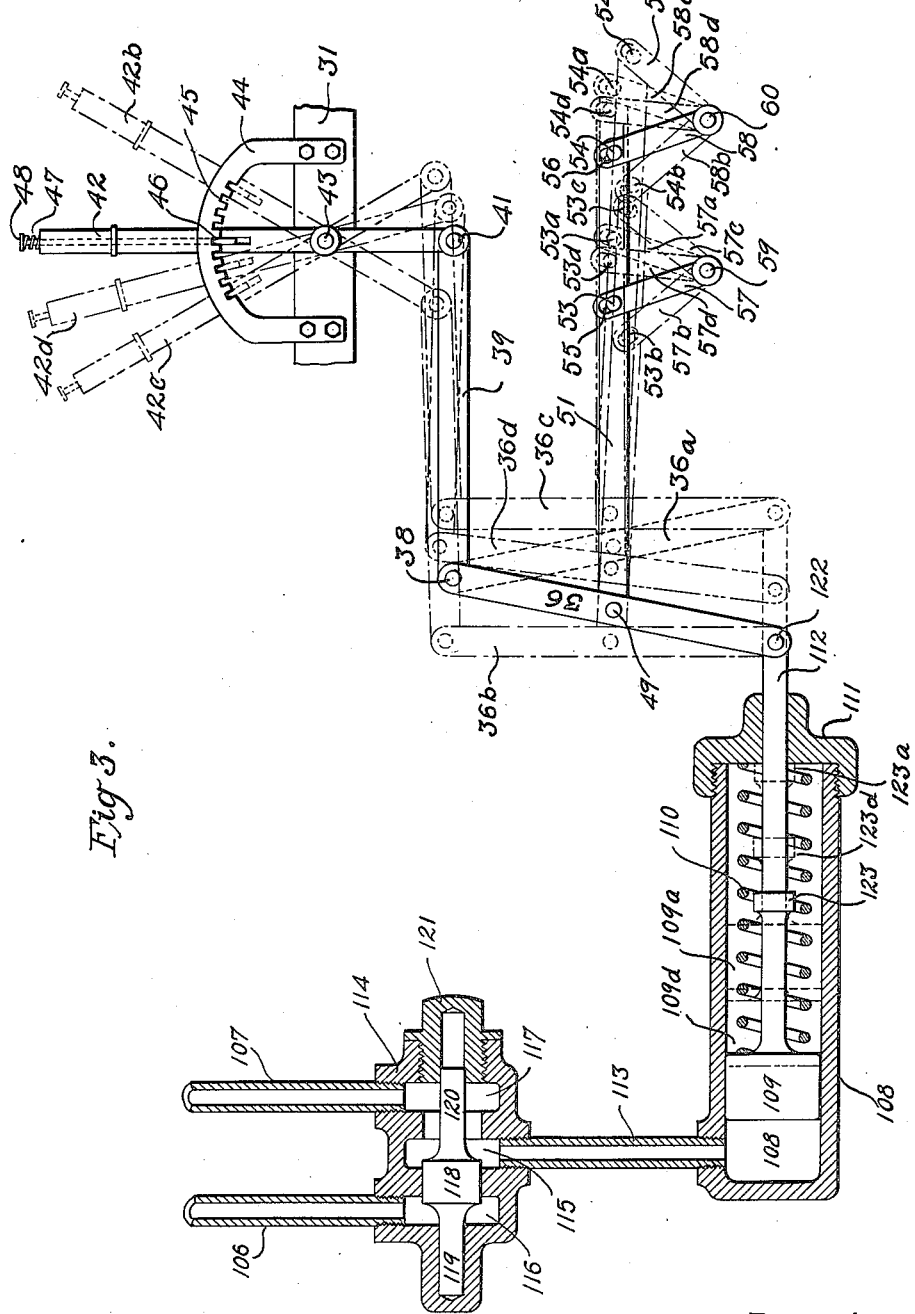

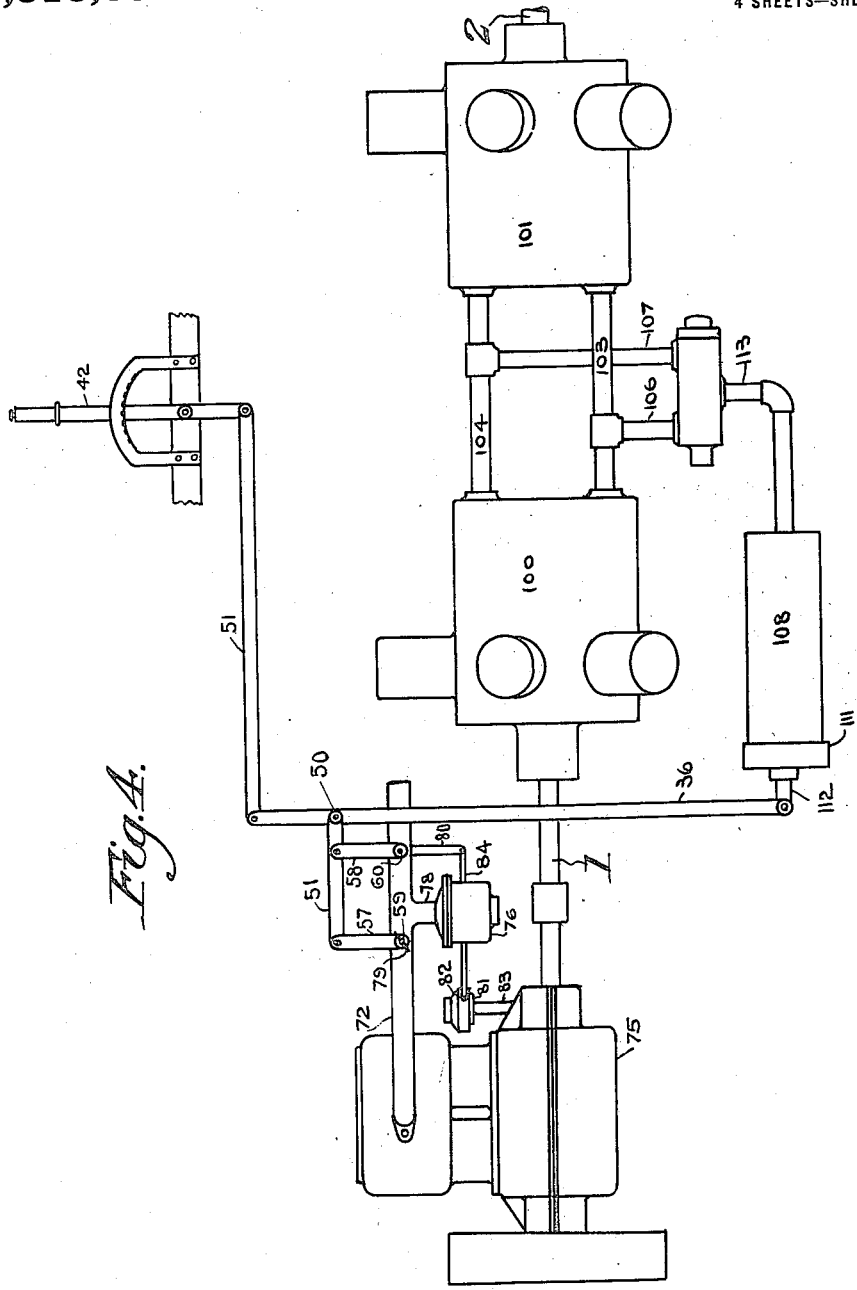

UNITED STATES PATENT OFFICE.

CHARLES M. MANLY, OF NEW YORK, N. Y.

MOTOR-CONTROLLING DEVICE.

1,318,399. Specification of Letters Patent. Patented Oct. 14, 1919.

Application filed August 8, 1906, Serial No. 329,740. Renewed January 31, 1919. Serial No. 274,329.

*To all whom it may concern:*

Be it known that I, CHARLES M. MANLY, a citizen of the United States, residing in New York city, New York, have invented certain Improvements in Motor-Controlling Devices, of which the following is a specification.

My invention relates to a controller for a motor which delivers its power to the driven device through connecting or transmission mechanism so constructed that variations in the torque of the driven device can be utilized to operate the motor controller.

One object of my invention is to combine such mechanism with simple and effective means for causing the operation of the controller to be automatic, and a further object is to so construct the device, that, while it will operate automatically under ordinary conditions, yet the operator may, at will, cause such automatic operation to be subsidiary to manual control.

With these objects in view, my invention consists of the combination of an internal combustion or other type of motor; a driven device; a device through which the power from the said motor is delivered, the latter device being so constructed that variations in resistance to the motion of the driven device will cause variations in pressure between two or more parts of the device through which the power is delivered; means for utilizing said variations in pressure to operate the controller, which automatically, within certain limits, effects changes in the power furnished by the motor, and means under manual control for changing at will the limits between which the control is automatic.

My invention wil be best understood by reference to the accompanying drawings, in which—

Fig. 2 shows a motor controller in which the connecting or transmission device is one employing fluid pressure.

Fig. 3 shows certain parts of Fig. 2 on a larger scale; and

Fig. 4 is a diagrammatic view showing my invention combined with a motor of the internal combustion type.

Figure 1:
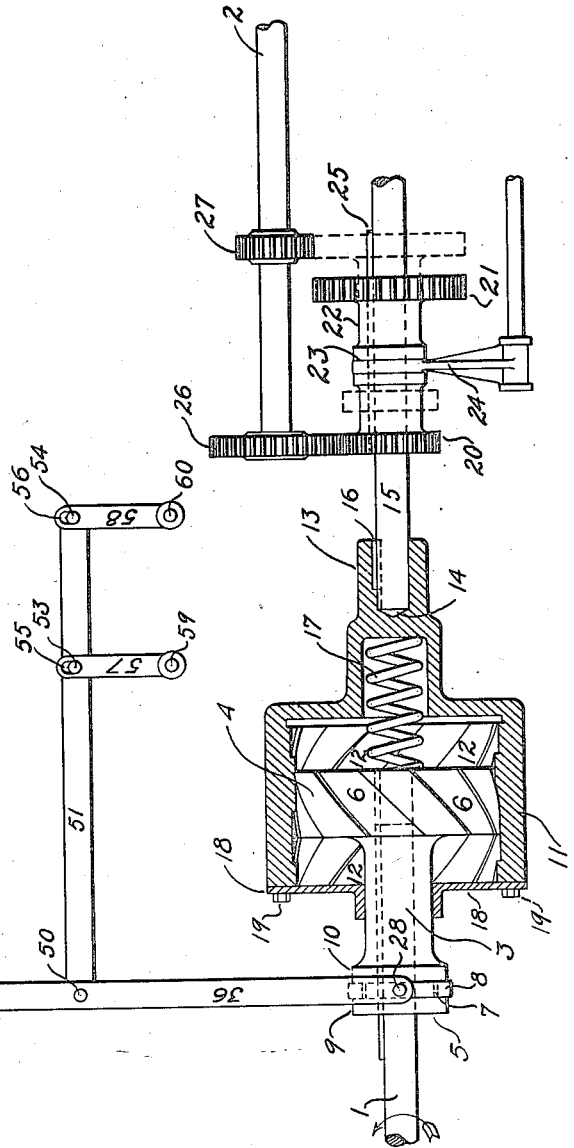
Figure 1 shows a motor controller arranged in accordance with my invention and wherein the connecting or transmission device consists entirely of mechanical parts.

In Figs. 1, 2 and 3, which illustrate two forms in which my invention may be carried out, I have not shown the power-generating motor, as it will be understood that this may be of any type. In Fig. 4, however, I have shown the controller, illustrated in Fig. 2, applied to or combined with a motor of the well known type of internal combustion engine in which a mixture of air and gas is exploded by an electric spark or other suitable means, and in which the speed and power of the engine is regulated by varying the proportions of the mixture of air and gas; and, if desired, further regulated by advancing and retarding the point in the cycle at which the ignition of the mixture occurs. For convenience, I have also shown, in Figs. 1, 2, and 3, the controller arranged for use in controlling a motor of the internal combustion type.

In Fig. 4 the numeral 75 indicates an internal combustion engine, provided with a carbureter 76, connected to the engine by a pipe 77, through a branch 78, in which is mounted a mixture control valve 79, all of a common and well known construction. The stem 59 of the valve 79 is rigidly connected to the lower end of the lever 57, whereby motions of the said lever 57 control the mixture supplied to the engine, as hereinafter explained. At the right hand side of the engine is its sparking device 81, here shown as of the usual construction, in which a rotary adjustment of its relatively fixed cap 82, with respect to its rotating shaft 83, serves to advance and retard the point in the cycle at which ignition occurs, in the usual way. This relatively fixed cap 82 has a rocking connection with the rod 84, to which is attached the lever 80, formed on the stem 60, that is mounted on the pipe 77, and having the lever 58 rigidly fastened to it, whereby motions of the said lever 58 control the ignition of the engine, as hereinafter explained.

Referring now to Fig. 1, the numeral 1 indicates the power shaft which is here shown as broken at its left hand end, and shown in Fig. 4 as prolonged to form the crank shaft of the motor 75 which furnishes the power. The driven shaft 2 is shown as broken at its right hand end but supposed to be connected to some driven device the load or resistance of which is subject to variation. Mounted on the shaft 1, and secured thereto by a key free to slide back and forth in its key-way, is a drum 3 on one end of which is a head 4 and on the other end of which is a smaller head 5. Formed in the head 4 are spiral grooves 6, and formed in the head 5 is a circular groove 7, into which is journaled a collar 8 which rests between two shoulders 9 and 10. Surrounding the head 4 is a hollow drum 11 on the inner circumference of which are formed spiral tongues 12 which fit into the spiral grooves 6, the right hand end of the drum 11 having a hub 13 in which is formed an opening 14 for the reception of a shaft 15 secured therein by a key 16. Between the right hand end of the head 4 and the bottom of the hollow drum 11 is a spring 17 which acts with a certain force tending to push the head 4 to the left, and on the left hand end of the drum 11 is a cover 18, secured thereto by the screws 19.

If it is desired that the driven device run only at the same speed as the motor at all times, the shaft 15 may be connected directly to the driven device, and the remainder of the mechanism, shown at the extreme right hand end of Fig. 1, may be dispensed with.

I have, however, here shown a conventional representation of a change gear device, which I will briefly describe, but the object of which will appear later. Mounted on the shaft 15 are two gears 20 and 21 which are joined together by a neck 22 in which is formed a circular groove 23, and in the latter is journaled a pronged lever 24. The gears 20 and 21 are fastened to the shaft 15 by a key 25 which co-acts with a key-way formed in the gears and enables the shaft 15 to drive the said gears and at the same time permits them to be shifted longitudinally on the shaft. Mounted on the shaft 2 is a gear 26 and a gear 27. The full lines show the gear 20 meshing with the gear 26, and the dotted lines show the gear 21 meshing with the gear 27, and as the relative proportions of the two sets of gears are different the shaft 2 can be driven at two different speeds relative to the speed of the motor. On the collar 8 is a pin 28 which has a rocking connection with one end of the lever 36, and at the other end of said lever 36 is a pin 38 by which it is connected to one end of a link 39, the other end of said link 39 being connected by a pin 41 to a lever 42. At a point intermediate of its length the lever 42 is fastened to the frame 31 by a pin 43, and fixed to the frame 31, with the pin 43 as a center, is a quadrant 44 in which are formed notches 45. Mounted on the side of the lever 42 is a pawl 46 which engages with the notches 45, being normally held in contact therewith by a spring 47 on the end of the lever 42. Mounted on the spring 47 is a button 48 which, when pressed upon, releases the pawl 46 from the notches 45 of the quadrant 44, and at the middle of the lever 36 is a pin 50 which connects it to the left hand end of the link 51. Near the right hand end of the link 51 are pins 53 and 54 which co-act, respectively, with slots 55 and 56 formed near the ends of the levers 57 and 58, respectively. The other end of the lever 57 is connected to the stem 59 which is shown in Fig. 4 as the stem of the valve 79 controlling the mixture, where the motor is an internal combustion one. The other end of the lever 58 is fastened to the stem 60, shown in Fig. 4 as the stem by which the spark or ignition is advanced or retarded when the motor is of the internal combustion type.

Supposing now that the parts are in the positions shown, and the shaft 1 is revolving in the direction of the arrow in Fig. 1 and that the shaft 2 is connected to some driven device on which there is an appreciable load, the head 4 of the drum 3 being in about the mid position of its longitudinal movement in the drum 11, and the resistance of the drum 11 to rotation having caused the head 4 to wind up into the drum 11 through the spiral grooves 6 co-acting with the spiral tongues 12, thereby compressing the spring 17, the amount of such compression being an exact measure of the torque between the drum 11 and the head 4.

Suppose now that the load on the driven device decreases. The spring 17, re-acting against the head 4, will force the said head 4 to the left until the decrease in the compression of the spring is proportional to the decrease in torque between the head 4 and the drum 11, due to the decrease in the load, and such motion of the head 4 toward the left will cause the collar 8 in the groove 7, through the pin 28, to rock the lever 36 toward the left with the pin 38 as a center, the effect of which will be transmitted through the link 51 and will cause the levers 57 and 58 to be rocked toward the left, the effect of motion in this direction being supposed to cause the motor to deliver less power in proportion to the extent to which the said levers have been rocked. Similarly, an increase in load on the driven device will cause the head 4 to be forced farther up into the drum 11 which will rock the levers 57 and 58 toward the right, thereby, we will suppose, causing the motor to furnish more power in proportion to the extent that the levers have been rocked in this direction.

The above description has been based on the supposition that the lever 42 has been held stationary by the pawl 46 coacting with the notches 45 in the quadrant 44. If it is desired that the control of the motor is to remain automatic, with provision for changing the limits between which it is automatic, which limits we have found to be reached when the levers 57 and 58 have been rocked in either direction to bring the head 4 into contact with either end of the drum 11, these limits of automatic control can be changed by rocking the lever 42 to one side or the other, depending on whether it is desired to increase or decrease the limits, motion of the upper end of the lever 42 to the right causing the limits to be lowered, and motion to the left correspondingly causing the limits to be raised.

The space in the drum 11 between its two heads and the head 4 of the drum 3 is intended to be filled with oil which both lubricates the tongues and grooves and also acts to give a dash-pot effect, the amount of such effect being determined by the closeness with which the head 4 fits the drum 11, the effect being decreased if desired by holes drilled axially through the head 4. (See dotted lines Fig. 1). When such a dash-pot effect is provided, sudden shocks are prevented from causing sudden variations in the speed or power of the motor.

Should it be desired that the driven device be able to run at several, or even an unlimited number of, speeds different from the speed of the power generating motor, the spur gears, shown on the extreme right hand of Fig. 1, may be replaced with a hydraulic or fluid pressure gear or device either of the type shown in my Letters Patent hereinafter referred to, or some similar device, and the controller for the motor may be arranged as shown in Fig. 1 where the connecting or transmission device from which it derives its motion is composed entirely of mechanical parts. However, where a fluid pressure gear is interposed between the power generating motor and the driven device, I prefer to dispense with the mechanical transmission device and utilize the fluid pressure generated in the fluid pressure gear to operate the motor controller.

In Fig. 2 I have shown in outline a variable speed hydraulic transmission device in which the driving effect of one part is transmitted to another part through fluid introduced between the said parts. An example of a hydraulic transmission device of this character is disclosed in my Letters Patent No. 801,097 to which reference may be had for a detailed description thereof. I will, however, here describe so much of the mechanism as it is necessary to understand in order for the operation of the mechanism forming the subject matter of this application to be clear. The said hydraulic transmission device comprises a piston pump to be driven by the prime mover, a motor to drive the machine or element to be operated and fluid connections between the pump and motor. The pump forces fluid under pressure through one portion of the fluid connections to the motor, which fluid returns from the motor to the pump through another portion of the fluid connections to be again put under pressure and delivered to the motor, the pump, motor and connections thus forming a closed fluid circuit having a pressure side and a suction side. To vary the speed and direction of rotation of the motor relatively to the pump, means are provided to vary the stroke of the pump pistons in such manner that the flow of the fluid in the circuit is varied from a maximum amount flowing in one direction through zero to a maximum amount flowing in the opposite direction, hence the portion of the fluid connections which in one direction of rotation of the motor forms part of the pressure side of the fluid circuit becomes a part of the suction side of the circuit when the direction of rotation of the motor is reversed. As the motor is driven solely by the pressure of the fluid it is obvious that variations in the load on the motor produce exactly corresponding variations in the pressure of the fluid in the pressure side of the fluid circuit.

Referring now to Fig. 2, the shaft 1 of the power generating motor is continued to form, or is coupled to, the crank shaft of a pump 100 which is supposed to be of the well known type having three stationary radial cylinders. The hydraulic motor 101 is similar to the pump 100 and is operatively connected to the pump by a fluid which circulates between the said pump and motor through the two pipes 103 and 104. The crank shaft of the hydraulic motor is continued to form, or is connected to, the shaft 2 to which the driven device is connected. Connected to the pipe 103 is a shunt pipe 106 and connected to the pipe 104 is a shunt pipe 107.

In Fig. 3, I have shown the two pipes 106 and 107 as broken, and, in Fig. 2, I have shown that they connect one with each side of the fluid connection of the hydraulic transmission device. Supposing that with the parts as shown, pipe 106 is connected to the suction side and pipe 107 to the pressure side, where the motor is revolving in the same direction as the pump. In a cylinder 108 is mounted a piston 109 which is normally pushed toward the left hand end of the cylinder 108 by means of a spring 110, said spring acting against a cap 111 fastened to the right hand end of the cylinder 108, through which cap the piston rod 112, which is fastened to the piston 109, passes and is guided thereby.

Entering the cylinder 108 near its left hand end, is a pipe 113, the other end of said pipe being connected to a valve chamber 114 in which are formed three ports, 115, 116, and 117. Mounted in the valve chamber 114 is a valve 118, consisting of a central head from each end of which project stems 119 and 120, the stem 119 centering in a bore in the left hand end of the valve chamber and the stem 120 in a plug 121 which is screwed into and closes the right hand end of the said valve chamber. The pipe 106 leading from the suction side of the fluid connection of the gear, enters the valve chamber in the port 116 and the pipe 107 from the pressure side of the fluid connection enters port 117. Fastened to the right hand end of the piston rod 112 by a pin 122, is the lever 36, which is the same as the lever 36 in Fig. 1, and all the other links, levers, etc., here shown are the same as the corresponding parts having the same reference characters in Fig. 1.

Suppose that when the levers 57 and 58 which control the mixture and the ignition respectively, are in the positions indicated by the full lines, the engine is running at a low speed but not capable of furnishing much power, the piston 109 will be at the extreme limit of its motion toward the left hand end of the cylinder 108, and supposing that the engine is revolving but is not furnishing power, there will not be any pressure in the fluid connection of the gear, such a state of affairs in the gear having been brought about by passing the fluid from one side of the fluid connection to the other by suitable means or, if the fluid operated gear is of the variable speed type above referred to, by reducing the stroke of the pump to zero. Suppose now that the operator desires to use power from the engine and makes his demands on it by closing the bypass or by increasing the stroke of the pump. Pressure will immediately be generated in the fluid connection and such pressure will immediately pass from the pipe 104 through the pipe 107 into the port 117, thence into the port 115, pushing the small valve 118 to the left if necessary, thence through the pipe 113 into the left hand end of the cylinder 108, where it will react against the head of the piston 109, thereby compressing the spring 110 and forcing the piston rod 112, the lever 36 and the link 51 toward the right, thereby rocking the levers 57 and 58 toward the right, the said levers 57 and 58 respectively changing the mixture and advancing the spark, thereby causing the engine to generate more power.

As further increases in pressure are demanded from the gear, each increase of pressure causes a corresponding change in the mixture and advance in the spark until the piston 109 has been forced to the right to the point at which a shoulder 123 comes in contact with the cap 111, after which any increase in pressure will cause no further change in the mixture or the spark, the limit of adjustment in this direction being indicated by the position of the parts shown by the dotted lines whose numerals have the subscript "a" attached to them. The spring 110 is supposed to be of such a tension that it will be compressed sufficiently to allow the shoulder 123 on the rod 112 to come in contact with the cap 111 when the pressure in the fluid connection reaches a certain value which in general is taken at something less than the normal working pressure. Should the operator desire still further to change the mixture and advance the spark beyond that automatically obtained by the increase of the fluid pressure forcing the shoulder 123 on the piston rod 112 against the cap 111, it may be obtained by pressing the button 48 thereby releasing the pawl 46, when the top of the lever 42 may be adjusted toward the left, thereby moving levers 57 and 58 still farther toward the right, the supposed limit of such adjustment in this direction being indicated by the positions shown by the dotted lines whose numerals have the subscript "c" attached to them. Should the operator, on the other hand, desire that the mixture and spark be so changed that the engine will run at a speed lower than that given by the automatic control, it may be obtained in the same way by shifting the top of the lever 42 toward the right, the supposed limit of motion in this direction being indicated by the dotted lines where the parts in their proper relative positions are indicated by the numerals having attached to them the subscript "b".

Should the operator desire that the engine run at a higher or a lower speed than intermediate positions of the automatic control would give, such higher or lower speeds may readily be obtained by the operator, without in any way displacing the automatic control, by pressing the button 48, releasing the pawl 46, and moving the lever 42 either to the right or to the left, motions to the right giving lower speeds and motions to the left higher speeds than particular intermediate position of the automatic control would give with the lever 42 in its central position. It is thus seen that the operator has it within his control to change the limits between which the control is automatic and that this may be done without in any way affecting the automatic control except to change the limits between which it operates. I have indicated one such intermediate position of the automatic control with the limits of its control changed from what they normally are when the manual control lever 42 is in its natural position, such intermediate position being indicated by the parts being shown in dotted lines with the numerals having the subscript "d".

It will be noted that should the functions of the two sides of the variable speed gear be reversed so that the side which was formerly the pressure now becomes the suction and vice-versa, the operation of the automatic controller would be in no way affected, since, if the pressure is supplied through the pipe 106 to the valve chamber 114, the fluid will pass into the port 116 thereby pressing against the left end of the valve head 118 and forcing it to the right until the stem 120 comes in contact with the plug 121; the said head 118 having thereby uncovered the port 115 and allowed the fluid to pass through it from the port 116 into the pipe 113 and thence into the cylinder 108.

All joints requiring it will be packed by the means well known to the art.

I claim:—

1. The combination of an internal combustion motor, a driven device, a fluid pressure operated variable speed gear connecting the two, means for simultaneously varying the mixture and the point of ignition for said motor, and means for causing variations in pressure of the fluid in said gear to automatically control the variations of the said mixture and said point of ignition of said motor.

2. The combination of an internal combustion engine, a device to be driven thereby, a fluid pressure operated variable speed gear connecting them together, means operated by fluid pressure from the said gear for causing, within certain limits, the engine to increase its speed in proportion to the increase in pressure in said gear, and manually operated means for controlling said limits.

3. The combination of an internal combustion motor having an adjustable igniter and throttle valve, a driven device, and means operated by changes in the resistance of the driven device for adjusting said igniter and throttle comprising a lever operatively connected to said driven device and said igniter and throttle, and having an adjustable fulcrum whereby the effect of said changes on said igniter and throttle may be varied.

In testimony whereof, I have signed my name to this specification, in the presence of two subscribing witnesses.

CHARLES M. MANLY.

Witnesses.
L. D. EAKINS,
JENNY C. CHRISTIANSEN.